(12) United States Patent
Picard

(10) Patent No.: US 8,131,417 B2
(45) Date of Patent: Mar. 6, 2012

(54) AUTOMOTIVE DIAGNOSTIC AND ESTIMATE SYSTEM AND METHOD

(75) Inventor: Benjamin Clair Picard, Muir Beach, CA (US)

(73) Assignee: Driverside, Inc

( * ) Notice: Subject to any disclaimer, the term of this patent is extended or adjusted under 35 U.S.C. 154(b) by 731 days.

(21) Appl. No.: 12/202,010

(22) Filed: Aug. 29, 2008

(65) Prior Publication Data

US 2009/0062978 A1   Mar. 5, 2009

Related U.S. Application Data

(60) Provisional application No. 60/968,740, filed on Aug. 29, 2007.

(51) Int. Cl.
*G01M 17/00* (2006.01)
(52) U.S. Cl. ........................................ 701/29
(58) Field of Classification Search ............ 701/29, 701/30
See application file for complete search history.

(56) References Cited

U.S. PATENT DOCUMENTS

| | | | |
|---|---|---|---|
| 2002/0007237 A1 | 1/2002 | Phung et al. | 701/33 |
| 2004/0088088 A1 | 5/2004 | Bates | 701/33 |
| 2007/0179691 A1 | 8/2007 | Grenn et al. | 701/29 |

OTHER PUBLICATIONS

International Search Report and Written Opinion dated Nov. 18, 2008, for International Application No. PCT/US 08/74918, which corresponds to U.S. Appl. No. 12/202,010.

*Primary Examiner* — Faye M. Fleming
(74) *Attorney, Agent, or Firm* — Timothy J Bechen; Williams Mollen

(57) ABSTRACT

The method provides users with estimates for vehicle repairs. The user, typically the vehicle owner, provides details sufficient to identify the vehicle, and location details to enable the system to locate suitable mechanics and replacement parts, and determine labor costs and times. The user may provide symptoms of the problem, and the system provider automatically determines the likely cause of the symptoms. Once a diagnosis has been generated, local labor and replacement auto part prices are automatically located, and a repair estimate automatically calculated. The estimate, along with a list of local mechanics with interest or expertise in the particular type of repair, is then automatically communicated to the vehicle owner.

21 Claims, 13 Drawing Sheets

222

| User | Year | Make | Model | Engine | Transmission | Location | Mileage |
|---|---|---|---|---|---|---|---|
| D. Born (123456) | 2002 | Toyota | Camry | 4 cyl. 1.6 liter | Auto | Las Vegas | 1,000 |
| . . . | . . . | . . . | . . . | . . . | . . . | . . . | . . . |
| M. Rose (4985858) | 1991 | Porsche | 911 | 6 cyl. 3.3 liter | Manual | San Francisco | 120,000 |

| ID | Location | Makes serviced | Years serviced | Parts serviced | Payments and Coupons | Rating |
|---|---|---|---|---|---|---|
| Joe's Auto | Mill Valley | Japanese cars | ≥1980 | Brakes, transmissions | All major credit cards | ★★★ |
| . . . | . . . | . . . | . . . | . . . | . . . | . . . |
| Mechanix R Us | Dallas | U.S. Boats | ≥2002 | engines | Cash Coupon | ★★★★★ |

| Vehicle | Year | Symptom | Diagnosis | Estimate |
|---|---|---|---|---|
| All | | Grinding Brakes | Replace Pads/Discs | $300-$700 |
| Honda Civic | 2001/2002 | Door Open Light On | Replace Door Sensor | $150-$300 |
| . . . | . . . | . . . | . . . | . . . |

FIG. 2D

Select Year...     1984 ▼ *
Select Make...     BMW ▼ *
Select Model...     318i ▼
Select Engine...     6 Cylinder ▼ *
Select Transmission...     Automatic ▼ *
Select Location...     San Francisco Bay Area - City of San Francisco ▼ what seems to be the problem?

Select Problem Area...     Braking Problems ▼ *
Select Problem...     Brakes Squeal ▼

OPTIONAL - already know the repair?

Select Repair Type...     Brake Related ▼
Select Repair....     Front Brake Job ▼ where should we send your results?

Email

First Name

Phone

[H#$&]

Type Security Code:

☑ I agree to Terms of Use and Privacy Policy

FIG. 3F

My Marketing Campaign

Campaign: Auto Repair – Domestic
Location: Atlanta
Price: $3 per customer request

---

Up to how many customer requests would you like per day?

Requests per day [ ]

---

Send special offers to customers automatically?

| Enter terms of offer here. For example : 10% off services of $100 or more. |

[FINISH]

FIG. 3G

My Active Customer Campaigns

| Campaign | Location | Budget | Offer Coupon | Actions |
|---|---|---|---|---|
| Auto Repair - Domestic | Atlanta ▼ | 5 requests/day ▼ | Yes ▼ | Unsuscribe |
| Auto Repair - Foreign | Atlanta ▼ | 5 requests/day ▼ | Yes ▼ | Unsuscribe |

FIG. 3H

Search for Customers

Customer request type:   Auto Repair - Domestic ▼

Location:   Atlanta ▼

Keywords:   [          ]

Maximum Age (Days):   [   ]

[ Search ]

FIG. 3I

Search Results
Search found 2 requests

| Request | Location | Year | Make | Model | Details | Time | Price |
|---|---|---|---|---|---|---|---|
| ☐ 14 | Atlanta | 2002 | Ford | Escort | Oil Change | Aug-12 11:00 AM | $3.00 |
| ☐ 13 | Atlanta | 1999 | Toyota | Corolla | Headgasket | Aug-11 10:00 PM | $3.00 |

Price of selections: $0.00

[ Back ]   [ Add to Cart ]

FIG. 3J

Looking to earn extra income from your website?

By integrating the Pre-Service Report tool on your site, you can earn commissions of up to 50%! Now that's fair!

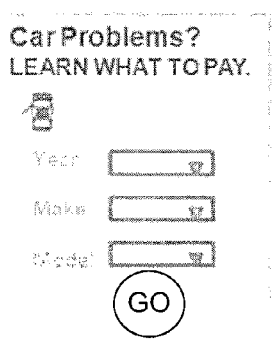

GET THE WIDGET!

No sign-up fee. No risk.
Simply create an account and start sharing proceeds.

Join Now!

FIG. 4B

My Account
Customer requests sold: 2
Balance: $12.50

| Request | Year | Make | Model | Details | Time | Price |
|---|---|---|---|---|---|---|
| 14 | 2002 | Ford | Escort | Oil Change | Aug-12 11:00 AM | $3.00 |
| 13 | 1999 | Toyota | Corolla | Headgasket | Aug-11 10:00 PM | $3.00 |

Week to Date: $12.50
Month to Date: $12.50
Year to Date: $12.50

FIG. 4C

My Active Affiliate Programs

| Campaign | Actions |
|---|---|
| Auto Repair - Domestic | Unsuscribe |
| Auto Repair - Foreign | Unsuscribe |

Other Available Affiliate Programs

| Campaign | Add to Cart? |
|---|---|
| Auto Repair - Domestic | Add |
| Auto Repair - Foreign | Add |

FIG. 4D

AUTOMOTIVE DIAGNOSTIC AND ESTIMATE SYSTEM AND METHOD

CROSS-REFERENCE TO RELATED APPLICATIONS

The present application is based on, and claims priority to U.S. Provisional Patent Application No. 60/968,740, filed on Aug. 29, 2007, the disclosure of which is hereby incorporated by reference herein in its entirety.

BACKGROUND (a) Technical Field

The disclosure herein relates to systems and methods for remotely diagnosing vehicular problems, providing fair-market cost estimates for repairs, issuing automated service reminders, and/or generating leads for repair shops.

(b) Description of the Related Art

Existing systems for diagnosing and repairing vehicles have a number of drawbacks. For example, most vehicle owners do not have the technical expertise needed to diagnose problems with their vehicles, let alone estimate the fair-market cost for repairing their vehicles. To obtain a diagnosis and estimate, a vehicle owner usually must take his or her vehicle to a repair shop during regular business hours to obtain an estimate from a vehicle mechanic whose goal is to maximize profits for the repair shop. This process is burdensome to the vehicle owner, and the vehicle owner has no way to determine whether the repair estimate is reasonable.

Furthermore, mechanics have limited ways to attract new business—typically through local advertising or referrals. Some mechanics may also prefer to attract new business that is focused to a particular expertise (e.g., late model Japanese cars) or certain types of work (e.g., brakes and tires).

As such, it would be highly desirable to provide systems and methods for simplifying the vehicle repair process for the vehicle owner while providing mechanics with focused leads for new business.

SUMMARY

According to some embodiments there is provided a computer implemented method for providing users with estimates for vehicle repairs. Vehicle information is received from a user including: at least a location for vehicle repairs, symptoms, a location for the repairs, etc. The user, typically the vehicle owner, provides details sufficient to identify the vehicle, and location details to enable the system to locate suitable mechanics and replacement parts, and determine labor costs and times.

A problem is identified with the vehicle based on the vehicle information. For example, the user may provide symptoms of the problem, and a system provider automatically determines the likely cause of the symptoms, i.e., diagnoses the problem without human intervention.

In some embodiments, the diagnosis of the problem is provided by the user or the vehicle's on-board computer.

A repair estimate for repairing the problem is then determined. The repair estimate is based on the identified problem, the vehicle information, and vehicle repair estimate data. Finally, the repair estimate is transmitted to the user for display. In other words, once a diagnosis has been entered or generated, local labor and replacement auto part prices are automatically located, and a repair estimate automatically calculated. The estimate, along with a list of local mechanics with interest or expertise in the particular type of repair, is then automatically communicated to the vehicle owner. Diagnostics and estimate information may be previously received from one or more mechanics or third party data providers.

The user may also be sent a list of suitable mechanics to repair the problem in the city where the vehicle is located. Incentives, like coupons, may also be sent to the user along with the list of suitable mechanics. The list may also include the contact information for at least one mechanic. The system may also facilitate scheduling an appointment between the user and at least one mechanic on the list. Feedback may be provided to the system provider from the user or the mechanic. The feedback may include at least an indication whether (i) the estimate was accurate, (ii) the diagnosis was accurate or (iii) whether the user and mechanic scheduled an appointment.

According to some embodiments of the invention, there is provided a system for providing users with estimates for vehicle repairs. The system includes one or more system provider servers having: a processor, communication circuitry for communicating with one or more mechanics and one or more users, and a memory. The memory includes communication procedures for communicating with the one or more mechanics and the one or more users, a mechanic database containing a list of mechanics each associated with a particular geographic location, a diagnostics database comprising multiple symptoms and associated vehicle problems, a user database comprising information for multiple users, where each user is associated with a particular vehicle, and an estimate module for determining a repair estimate for repairing a vehicle problem based on an identified problem, vehicle information received from a user, and vehicle repair estimate data stored in the diagnostics database. The memory may also include a diagnostics module for diagnosing the problem based on problem symptoms received from the user.

Finally, accordingly to some embodiments there is provided a computer readable storage medium storing one or more programs for execution by a computer. The one or more programs have instructions performing the computer implemented method for providing users with estimates for vehicle repairs, as described herein.

The above described systems and methods significantly simplify the vehicle repair process for the vehicle owner while providing mechanics with focused leads for new business. This is achieved by combining diagnosis of vehicle problems and local part and labor repair estimates for the specific vehicle in question. The described systems and methods may also provide integrated feedback to improve the diagnoses and estimates. The described systems and methods may also provide new lead generation for mechanics. Finally, the described systems and methods may also offer trigger-based alerts for routine and non-routine maintenance.

BRIEF DESCRIPTION OF THE DRAWINGS

FIG. 2B is a block diagram of an exemplary user database shown in FIG. 2A.

FIG. 2C is a block diagram of an exemplary mechanic database shown in FIG. 2A.

FIG. 2D is a block diagram of an exemplary diagnostics database 232 shown in FIG. 2A.

FIG. 3F is a schematic views of an exemplary vehicle owner interface.

FIGS. 3G-3J are schematic views of an exemplary mechanic interface.

FIGS. 4B-4D are schematic views of an exemplary affiliate interface.

Like reference numerals refer to the same or similar components throughout the several views of the drawings.

DETAILED DESCRIPTION OF PREFERRED EMBODIMENTS

Exemplary embodiments of the present invention will hereinafter be described in detail with reference to the accompanying drawings. These embodiments provide systems and methods for diagnosing problems with vehicles, providing repair estimates, and/or providing new business leads to one or more repair shops or mechanics.

The term "mechanic" or "mechanics" refers to one or more individuals or repair shops that repairs vehicles. The term "vehicle," while discussed primarily with reference to personal vehicles like cars, should be understood to include any means of transport, including, but not limited to, land vehicles (e.g., cars, trucks, motorcycles, bicycles, skateboards, trains), water vehicles (e.g., speedboats, jet-skis), aircraft (e.g., planes, helicopters) and spacecraft.

Figure 1:
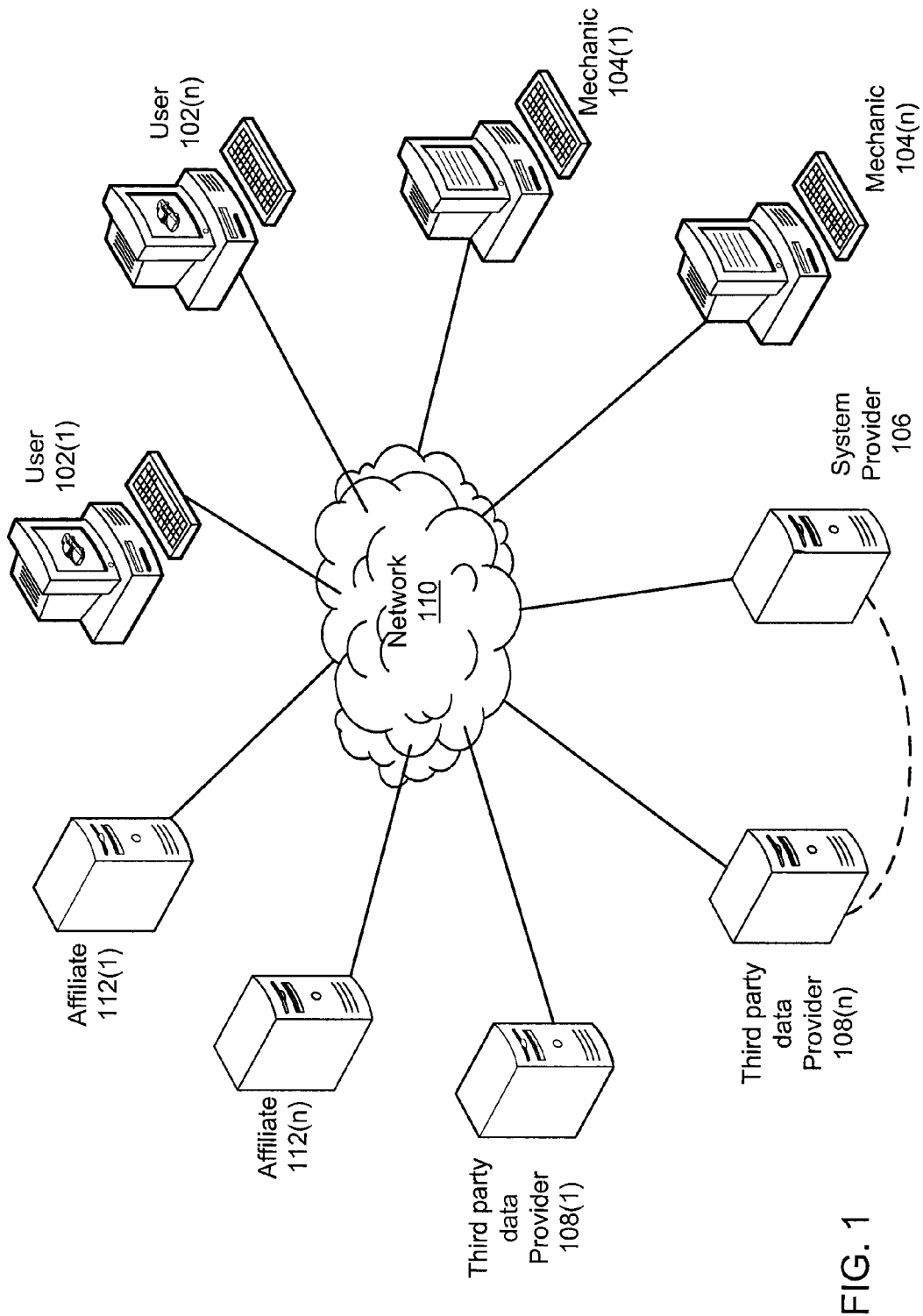
FIG. 1 is a schematic view of an exemplary system for remotely diagnosing vehicular problems, providing fair-market cost estimates for repairs, and/or generating leads for repair shops.

Turning now to the drawings, FIG. 1 illustrates an exemplary communications system for providing communication between a system provider, users, mechanics, third party data providers, and affiliates. A network 110, such as the Internet, is used to connect users 102 with the system provider 106. It should be noted that while the users 102 are typically the vehicle owners, a user may be any party who maintains a vehicle, including one or more individuals, companies, or organizations that use, drive, own, or lease the vehicle to be repaired. In some embodiments, the user can refer to a vehicle's on-board computer system. The system provider 106 is the party that operates the claimed systems and methods, i.e., provides the users with diagnoses and estimates, and provides the mechanics with new business leads.

The system provider 106 is also in communication with mechanics 104 and/or third party data providers 108 through the network 110. In some embodiments, the communications between the system provider 106 and the users 102 and mechanics 104 uses standard TCP/IP protocols to communicated between the users' and mechanics' web-browser and the web-server of the system provider 106. For example, the users 102 shown in FIG. 1 may communicate with the system provider 106 by accessing a website associated with the system provider 106. Also in some embodiments, the system provider 106 connects to the third party data provider 108 through another communication link and not through the network 110 (as show by the broken line). In yet other embodiments, the information described below as being provided by the third party data provider 108 is instead contained locally at the system provider 106. In some embodiments, the system provider 106 is also in communication with affiliates 112, described below.

Figure 2A:
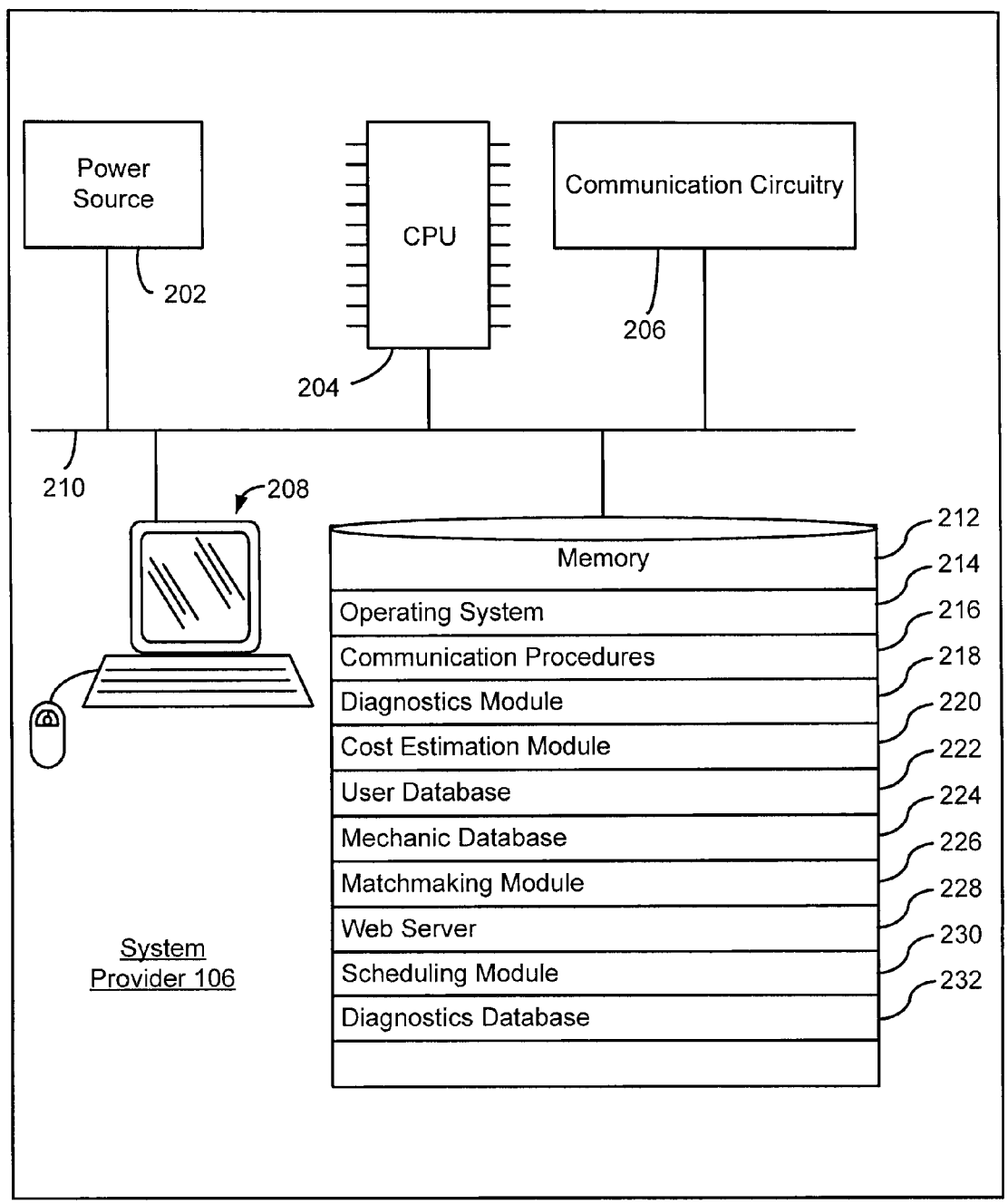
FIG. 2A is a block diagram of an exemplary system provider shown in FIG. 1.

FIG. 2A is a block diagram of the system provider 106 shown in FIG. 1. The system provider 106 may include a power source 202; at least one data processor or central processing unit (CPU) 204; communication circuitry or network interface 206 for communicating with the users 102, mechanics 104, and third party data provider 108 (FIG. 1); a user interface 208 such as a display, keyboard, and mouse; memory 212; and one or more signal lines or buses 210 for coupling these components to one another. The one or more signal lines or buses 210 may include one or more communications buses.

The memory 212 may include high-speed random access memory and/or non-volatile memory, such as one or more magnetic disk storage devices. Memory 212 may store an operating system 214, such as LINUX, UNIX or WINDOWS, that includes procedures for handling basic system services and for performing hardware dependent tasks. The memory 212 may also store communication procedures 216 for communicating with the users 102, mechanics 104, and third party data providers 108 (FIG. 1).

In some embodiments, the memory 212 may also store one or more modules and/or databases. A module as used herein refers to one or more instructions or procedures for performing a specified function. It should, however, be appreciated that the functions of the modules may be performed by dedicated hardware for performing the function, or a combination of hardware and software. The modules can include, but are not limited to, a diagnostics module 218 for diagnosing the vehicle problems; a cost estimation module 220 for estimating the cost to repair the problem with the vehicle; a matchmaking module 226 for matching a repair job with one or more mechanics; a web server 228 for serving web pages to the users 102 and mechanics 104; and a scheduling module 230 for scheduling vehicle repairs. The databases may include, but are not limited to, a user database 222, a mechanic database 224, and a diagnostics database 232.

FIG. 2B is a block diagram of an exemplary user database 222 shown in FIG. 2A. In some embodiments, the user database 222 stores profile information for each registered user, including a user identifier; identification information for one or more vehicles; user preferences; and the like. In some embodiments, a first-time user 102 may be prompted to register a new account by providing a desired username and password, identifying vehicle information, including year, make, model, engine information (e.g., number of cylinders), transmission information (e.g., manual or automatic), geographic location, and mileage. In other embodiments, a first-time vehicle owner may be prompted to enter a single piece of information such as a vehicle identification number (VIN) or license plate number, which the system may then use to perform an automatic lookup of a third party data provider 108 (FIG. 1) (e.g., CARFAX), to obtain the vehicle information and populate the user database 222.

When returning to the web-site generated by the Web server 228, the returning user may be prompted to enter login details, such as a username and password. The user's password may be the user's email address, vehicle license plate number, or VIN number. Several vehicles may be associated with a single username, in which case the user may further be prompted to select one of his or her vehicles, such as via a drop-down menu.

A returning user may also be prompted to enter updated information regarding current vehicle mileage. Alternatively, the system provider 106 may estimate updated mileage information, such as by using an estimate on number of miles driven per year, input by the user when the account was created. The user may also have the option to update other details, such as vehicle location or any other user or vehicle specific data in the user database.

In some current or future vehicles, the system provider 106 may communicate with the vehicle itself, such as with an on-board diagnostic (OBD) system. In this case, the vehicle information may be transmitted automatically (such as through wireless communication), without the need for human input.

FIG. 2C is a block diagram of an exemplary mechanic database 224 shown in FIG. 2A. In some embodiments, the mechanic database 224 may store profiles for various mechanics or repair shops, including: a mechanic identifier; geographic location; mechanics' preferences and specialties, such as types of vehicles serviced, models or years serviced, types of payment accepted, and ratings. In some embodiments, some of this information is furnished directly by the mechanic 104. For example, a mechanic may enter a specific street address, and may indicate that he or she only works on BMWs made between 1970 and 1985, or that he or she only services transmissions. The mechanic 104 may enter the types payment accepted, and whether he or she accepts credit card or personal checks. The first example shown in FIG. 2C, Joe's Auto, is located in Mill Valley, and services brakes and transmission on Japanese cars made in 1980 or later. Joe's accepts all major credit cards, and has a three-out-of-five-star user rating.

Alternatively, some or all of this information may be provided by a third party data provider 108. The rating may include more details, such as overall satisfaction, timeliness, accuracy of estimate, etc. In some embodiments, this information is entered by users 102 through a feedback system that is described below. In some embodiments, the rating information is additionally or alternatively provided by the mechanic and/or a third party data provider 108. In some embodiments, the third party data provider 108 is a user review system, such as YELP.COM or CITYSEARCH.COM. In some embodiments, the user rating is supplemented with the mechanic's certifications, trade memberships, etc., to create an overall rating.

FIG. 2D is a block diagram of an exemplary diagnostics database 232 shown in FIG. 2A. In some embodiments, the diagnostics database 232 includes information used for diagnosing problems with vehicles, including: common vehicle problems (for example, grinding brakes on any vehicle means that the vehicle needs to have the brake pads and/or the brake discs replaced); symptoms and associated problems for specific vehicles (for example, the driver's door switch in 2001/2002 HONDA CIVICS is likely to fail); and the like. The database may also include estimates for the cost of repairing the diagnosed problem. In some embodiments, this estimate information is entered and/or revised through a feedback system described below. In some embodiments, the estimate information is provided by a third party data provider 108. Some or all of the diagnostics database may be contained at the third party data provider 108.

Returning to FIG. 2A, the diagnostics module 218 uses information from the user database 222, as well as information regarding symptoms (which, in some embodiments, is directly input by the user 102, or alternatively provided by the vehicle itself), to identify likely problems with the vehicle from the diagnostics database 232. In some embodiments, the diagnostics module 218 also uses information provided by a third party data provider 108 in diagnosing the problem with the vehicle. For example, if a certain vehicle component is notorious for failing in a certain make or model of vehicle at a certain mileage, this information may be considered when determining the most likely diagnosis. In some embodiments, the diagnostics module 218 is given inputs of vehicle information and symptom information, and, by searching the diagnostics database 232, it outputs one or more likely problems with the vehicle. In other embodiments, if there are several possible diagnoses, the user 102 may be prompted to enter follow-up information (vehicle identification information and/or symptom information) to aid the diagnostics module 218 in selecting the most likely diagnosis of the problem. In yet other embodiments, the mechanics, or qualified professionals at the system provider, may review particular symptoms and diagnose the problem.

Once a single diagnosis has been made (either by the diagnostics module 218, or by being directly input by the user or vehicle), the cost estimation module 220 determines at least one fair-market estimate for a mechanic to repair the diagnosed problem. In some embodiments, the cost estimation module 220 calculates more than one estimate. For example, the cost estimation module 220 may calculate one estimate for a new replacement part, another for a used or refurbished replacement part, and yet another to repair the malfunctioning part. In some embodiments, the cost estimation module 220 uses information regarding the diagnosis, vehicle information, and/or location in calculating the estimate(s). In some embodiments, this information is required since labor rates vary with geographical location, and since certain vehicles may have more expensive parts, or harder-to-repair parts, than others. In some embodiments, information regarding local labor rates and vehicle-specific costs is provided by a third party data provider 108. Additionally and/or alternatively, this information may be revised by users 102 and/or mechanics 104 through the feedback system, described below.

The modules and databases described above need not be implemented as separate software programs, procedures, modules, or databases. The various modules, sub-modules, databases, and sub-databases may be rearranged and/or combined. The memory 212 may include additional modules, sub-modules, databases, and/or sub-databases; or fewer modules, sub-modules, databases, and/or sub-databases. The memory 212 may, therefore, include a subset or a superset of the above identified modules, sub-modules, databases, and/or sub-databases. Also, as mentioned above, each module can include one or more instructions or procedures for performing a specified function, dedicated hardware for performing the function, or a combination of hardware and software.

Figure 3A:
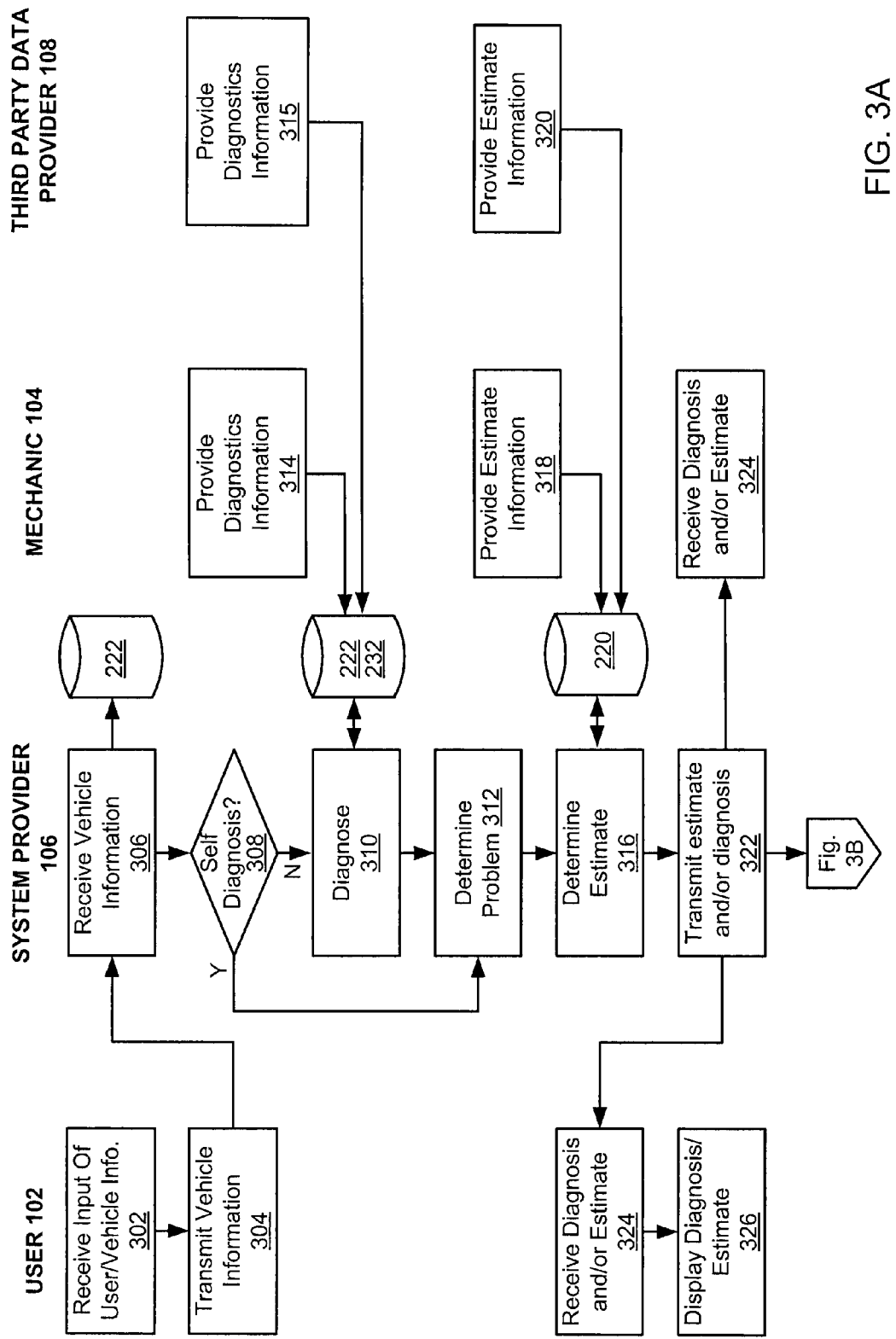
FIGS. 3A and 3B are flow charts of an exemplary method for remotely diagnosing vehicular problems, providing fair-market cost estimates for repairs, and/or generating leads for repair shops.

Exemplary systems having been described, some exemplary methods will now be discussed with reference to FIGS. 3A-3J. In some embodiments, once a user has navigated to the web-page generated by the web server 228, the user 102 establishes a user account and inputs user and vehicle information into his or her web browser at 302. This vehicle information may include the make, model, year, location, and problem symptoms of the vehicle. This information may also include the self-diagnosis of the vehicle owner. An example of a web page for receiving a user's input of this information is shown in FIG. 3F.

The user then transmits the user and vehicle information to the system provider at 304. The system provider receives the user and vehicle information at 306 and stores it into the user database 222.

The diagnostics module 218 then determines whether or not the information provided by the user includes a self-diagnosis at 308. If the information does not include a self-diagnosis (308—No), then the system provider diagnoses the problem at 310. If the information provided does include a self-diagnosis (308—Yes), then step 310 is bypassed.

In some embodiments, diagnostic information to populate the diagnostics database 232 is provided by the third party data provider 108 at 315. In some embodiments, the diagnostics database 232 is provided by the mechanic 104 at 314.

To perform the diagnosis, at 310, the diagnostics module 218 uses the user supplied vehicle information and symptoms to determine the problem, at 312, by matching the symptoms and vehicle with the most likely problem in the diagnostics database 232. In some embodiments, the diagnostics module 218 directly accesses the diagnostics data stored at the third party data provider 108 to make its diagnosis.

In the case of self-diagnosis, where the user or vehicle provides the diagnosis, the problem is determined, at 312, without the need to access the diagnostics database.

Once a diagnosis has been determined, at 312, the system provider determines an estimate to repair the diagnosed problem at 316. In some embodiments, the cost estimation module 220 determines the estimate based on the diagnosis, vehicle information, and/or estimate information input by the mechanic 104 and/or third party data provider 108 at 318 and 320, respectively.

The estimate and/or diagnosis is then transmitted to the user 102 and/or mechanic 104 at step 322. The user and/or mechanic receives the estimate and/or diagnosis, at 324, and displays it to the user at 326, such as by being displayed on a web page or on a vehicle's on-board computer screen. In some alternative embodiments, the information may be provided through email, traditional mail, a telephone call, a voicemail, a text message, or the like.

In some embodiments, if the user input the diagnosis at 302, only the estimate, and not the diagnosis, is provided to the user. In some embodiments, to avoid users obtaining diagnoses and then taking their vehicles to user-selected mechanics (which may or may not be associated with the system provider 106) without going through the system provider 106, the user must enter a valid email address, telephone number, and/or other identifying information, to the system provider before the estimate and/or diagnosis is transmitted to that email address or phone number.

Figure 3B:
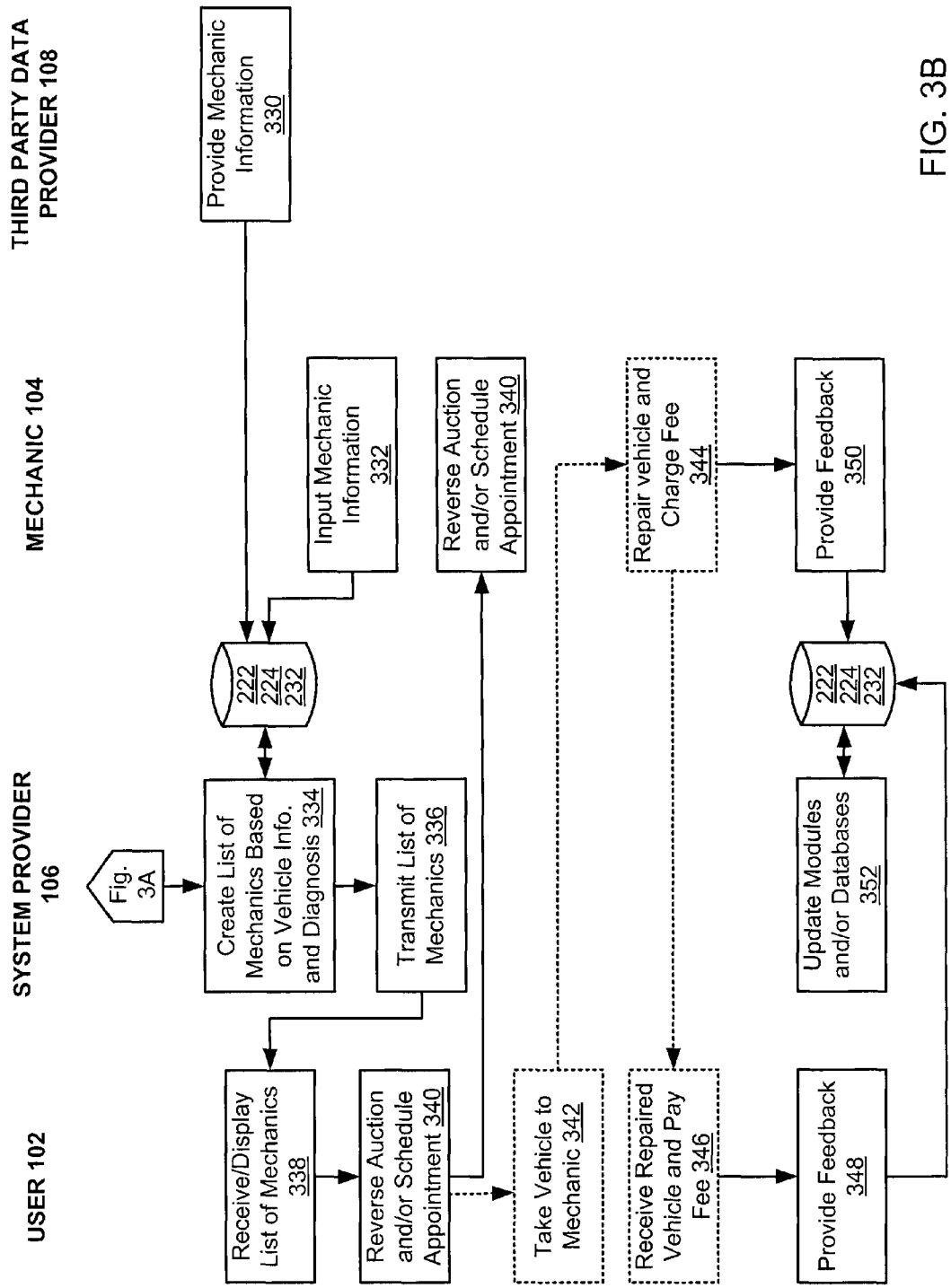

Turning to FIG. 3B, in some embodiments, the matchmaking module 226 generates a list of relevant mechanics at 334, based on the diagnosis, vehicle information, and optionally, mechanic information provided by mechanics 104 and/or a third party data provider 108 at 332 and 330, respectively. For example, only local mechanics that specialize in the vehicle or particular problem are listed. In some embodiments, this list of mechanics is stored in the mechanic database 224.

In some embodiments, this list of suitable mechanics is then transmitted to the user at 336. This list may include incentives provided by the mechanic, such as coupons or the like, all of which are stored in the mechanic database 224 during the creation of a marketing campaign. See FIG. 3G below for a detailed description on the creation of mechanic marketing campaigns. The list is received by the user at 338 and displayed to the user, such as by being displayed on the website or on the vehicle screen. In some embodiments, the list of mechanics is provided to the user together with the diagnosis and/or estimate. In some alternative embodiments, the list of mechanics is provided to the user through a valid email address, traditional mail, telephone call, voicemail, or text message, as described above with respect to the diagnosis and/or estimate.

After the user has received the list of relevant mechanics at 338, the user may schedule an appointment, at 340, with one of the mechanics, to have the user's vehicle repaired. In some embodiments, appointments with the mechanic are scheduled through the system provider 106, facilitated by the scheduling module 230, or by the system provider 106 facilitating email, traditional mail, telephone, voicemail, or text message communication between the user 102 and the selected mechanic 104. Alternatively, the scheduling of the appointment may occur directly between the user and the mechanic.

Additionally or alternatively, after the user has received the list of relevant mechanics at 338, the user and mechanic may enter into a reverse auction at step 340. In some embodiments, this is a two-stage auction, in which the user first selects a preferred mechanic. The user may first receive quotes from multiple mechanics to aid in the selection process, or may choose a mechanic based on location, specialty, rating, or any other mechanic information. If the mechanic is not available, turns down the job for any reason, or does not accept the job within a certain specified time period, the lead may expire. After the lead has expired, the user may select another mechanic, and/or other mechanics may be notified of the lead, and invited to bid on the job.

After the user has selected a mechanic, who has agreed to take on the job, and after the user and mechanic have scheduled an appointment, the user then may take his or her vehicle to the mechanic for the repair, at 342; the mechanic may perform an on-site diagnosis and estimate confirmation; the mechanic may repair the vehicle and charge a fee at 344; and the user may receive back the repaired vehicle and pay the fee at 346. It should be clear that in some embodiments, these steps 342, 344, and 346 occur offline without any electronic communications being handled through the system provider (as indicated by the broken line).

The user may then provide feedback at 348, such as rating the mechanic from one to five stars, and the feedback may be used to update the databases and/or modules at 352. For example, the user may provide feedback about whether the diagnosis and estimate for the repair were accurate. The mechanic's user rating may be changed based on this information and the diagnostics database may be updated to change the associations of symptoms and diagnosed problems, if appropriate. Mechanics that charge a fee that corresponds to the estimate may receive higher ratings than those that do not. The feedback may be input into the web server 228, or through email, traditional mail, telephone, voicemail, or text message. In some embodiments, the user receives a reminder after a specified time period has passed since the scheduled appointment, or since the diagnosis, estimate, and/or list of mechanics was provided to the user, reminding him or her to provide the feedback. For example, the user 102 may receive an email a week after the scheduled appointment containing questions, with embedded links containing the answers, such as: "Was the diagnosis correct? Yes or No." "Was the estimate: too high, too low, about right?" "What was your overall satisfaction with the mechanic you used, from 1-5 stars?" etc. This information may be used to update the mechanic's rating in the mechanic database. Highly-rated mechanics may be elevated in the sort order of the mechanic database, and/or may receive more leads than low-rated mechanics.

Similarly, the mechanics may provide feedback at 350, which may also be used to update the databases and modules at 352. For example, the mechanic may provide feedback that is used to change the associations of symptoms and diagnosed problems, if appropriate. For example, the diagnostics database may be updated to reflect that loud grinding from the brakes almost always requires skimming the brake discs or replacing them. In some embodiments, the mechanic also provides feedback to update the cost estimation module. The feedback may be input into the web server 228, or through email, traditional mail, telephone, voicemail, or text message. In some embodiments, the mechanic receives a reminder after a specified time period has passed since the scheduled appointment, or since the diagnosis, estimate, and/or list of mechanics was provided to the user, reminding him or her to provide the feedback.

Figure 3C:
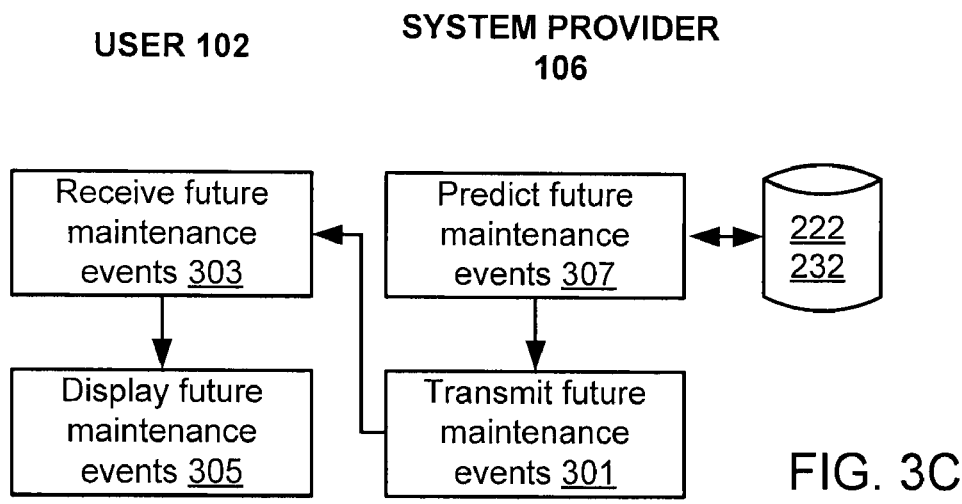
FIG. 3C is a flow chart of an exemplary trigger-based alert method.

Turning to FIG. 3C, in some embodiments, the system provider may additionally or alternatively be used to remind the user of future maintenance events. In some embodiments, these future maintenance events include routine events, such as oil changes, tire replacements, and tune-ups. In some embodiments, the user is automatically reminded of these events based on actual or estimated mileage, or time that has passed since the last routine event. In some embodiments, the user is automatically reminded of these events through the website when he or she logs in. A reminder is transmitted at 301. The user receives the reminder at 303, and it is displayed to the user at 305. In some embodiments, the user is alternatively reminded via email, traditional mail, telephone, voicemail, or text message.

In some embodiments, the future maintenance events include non-routine events. In some embodiments, likely non-routine events are predicted by the diagnostics module 218, at 307, based on the vehicle information and diagnostics database. For example, if a certain component is notorious for failing in a certain model or year of vehicle at a certain mileage, the system provider 106 may predict that the component is likely to fail soon, at 307, and inform the user of this fact at 301. In some embodiments, the user is informed of likely non-routine repairs through the website when he or she logs in at 303 and 305, or is reminded via email, traditional mail, telephone, voicemail, or text message.

In some embodiments, non-routine events are predicted by a prediction algorithm that forms part of the diagnostics module 218, at 307, using one or more statistical models, such as Bayes, Winters, multi-variate regression, and exponential smoothing. In some embodiments, vehicle information and/or a vehicle's repair history is used as an input to the prediction algorithm. Once the probability of a non-routine event is above a certain threshold probability, the user and/or mechanic is notified of the likelihood of the associated non-routine repair. In some embodiments, the threshold probability is selected by the user, or is selected by the system provider depending on the severity of the non-routine event.

Figure 3D:
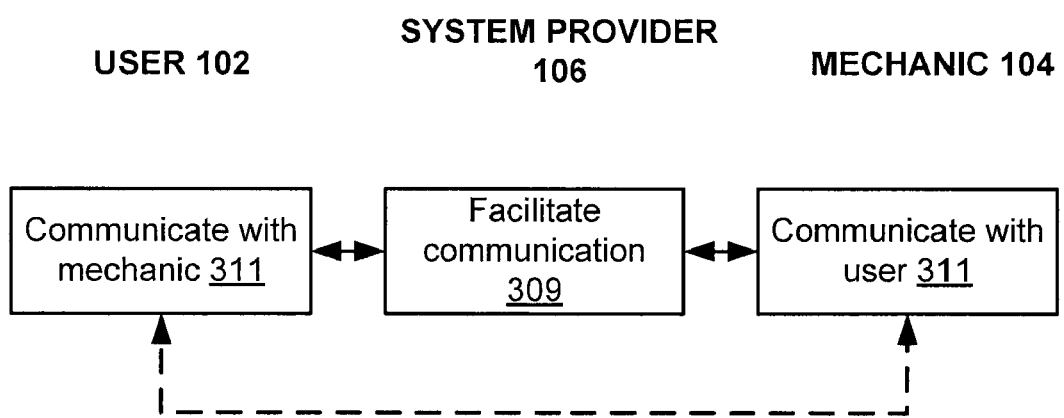
FIG. 3D is a flow chart of and exemplary communication facilitating method.

Referring to FIG. 3D, as an alternative to the methods described above, a user may choose to use the system provider simply as a means of locating and/or facilitating communication with a mechanic. For example, a user may search or browse the mechanic database via a website generated by the web server 228. In some embodiments, the user may search for a mechanic by inputting desired location, specialty, rating, or any other mechanic information. In some embodiments, a user may contact a mechanic through the system provider 106 at 309 and 311. In some embodiments, the system provider 106 may facilitate direct communication between the user and mechanic at 309, such as by providing the user with the mechanic's contact information and/or providing the mechanic with the user's contact information. The user and mechanic may then communicate with each other directly at 311.

A user supplied list of mechanics and scheduling of appointments etc. is handled as described above with reference to FIG. 3B.

Figure 3E:
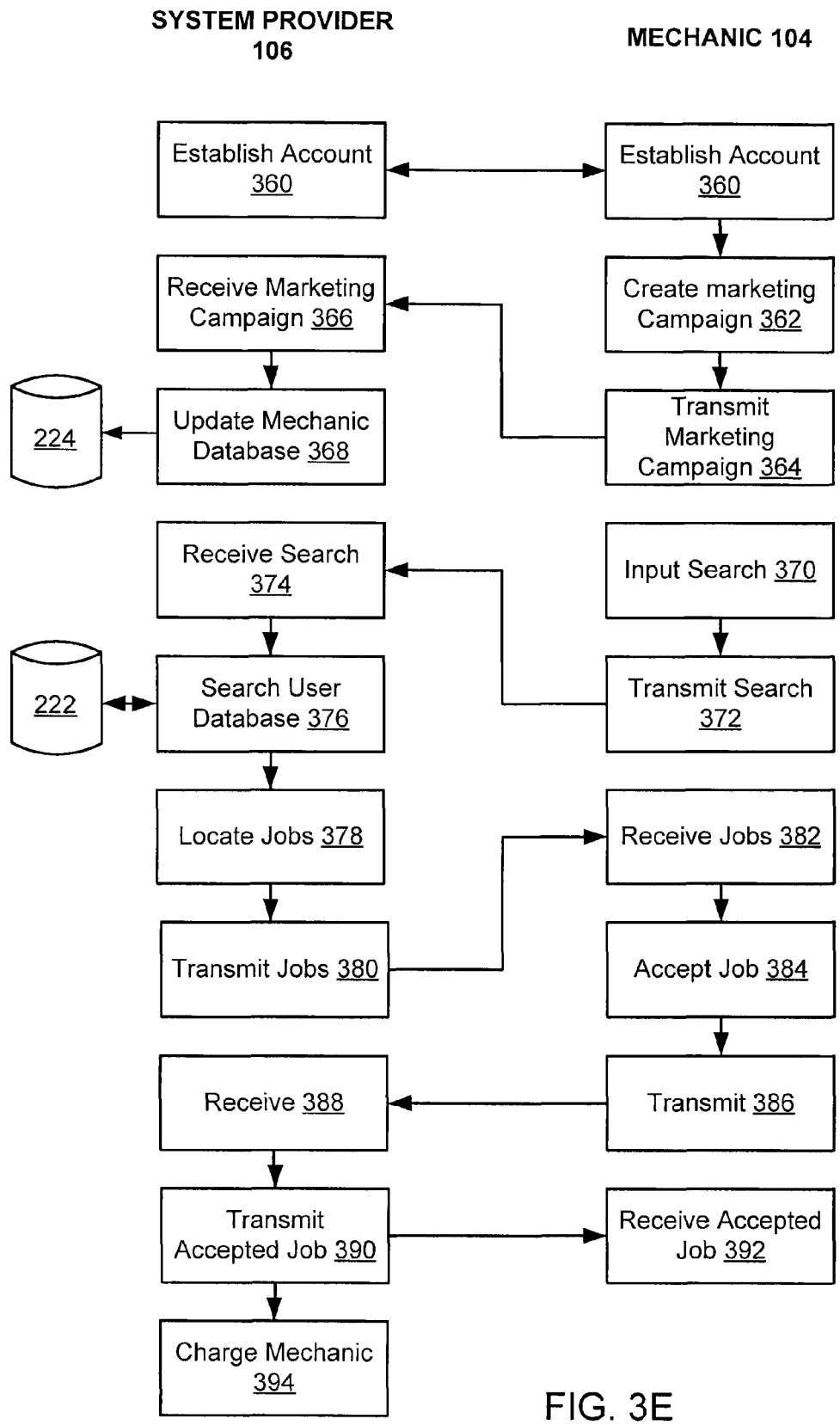
FIG. 3E is a flow chart of a mechanic initiated setup of a marketing campaign and/or a search for existing jobs.

FIG. 3E is a flow chart of a mechanic initiated setup of a marketing campaign and/or a search for existing jobs. The mechanic first establishes an account at 360. The mechanic then establishes a marketing campaign at 362 and transmits it to the system provider at 364. The marketing campaign may include the location of the mechanic, how may new job requests a day he would like, and whether the mechanic would like to send any incentives to the potential user, such as coupons etc. An exemplary web page where this information is captured is shown in FIG. 3G.

The marketing campaign is received by the system provider at 366, which then updates the mechanic database 224 to reflect the campaign at 368. A list of marketing campaigns displayed to the mechanic is shown in FIG. 3H.

At any time, the mechanic may also input a search for a new repair job at 370. This request is then sent to the system provider at 372. An example of a web page where the search is input is shown in FIG. 3I. The search is received by the system provider at 374. The system provider then searches the user database 376 for repair jobs that match the mechanic's request at 376. Repair jobs that match the mechanics search are then located at 378 and transmitted to the mechanic at 380. The search results are received by the mechanic at 382. An example of the search results is shown in FIG. 3J. The mechanic may then accept one or more new jobs at 384. The acceptance of any jobs is sent back to the system provider at 386, which receives the acceptance at 388. The accepted job information, such as the contact details for a user are transmitted to the mechanic at 390, who receives the lead for a new repair job at 392. The mechanic's account is then charged an agreed-upon rate for the new repair job lead at 394. In some embodiments, alternative pricing models are available to the mechanic.

Each mechanic signs up for an account and receives a username and password. In some embodiments, first-time mechanics are prompted to enter mechanic information such as that shown in FIG. 2B. In some embodiments, the mechanic 104 may log on to the web server 228 to search for customer requests. In some embodiments, the mechanics are notified of relevant customer symptoms, diagnoses, estimates, vehicle information, and/or contact information. These notifications may, in some embodiments, be displayed in the web server 228, or be transmitted through email, traditional mail, telephone, voicemail, or text message.

In addition or as an alternative to the systems and methods described above, a user may use the described systems and methods through an affiliate 112 (FIG. 1), such as through a website that is not generated by the web server 228 and is not directly associated with the system provider 106. In some embodiments, a user interface, such as that shown in FIG. 3F, is available through the affiliate website. In some embodiments, a modular web-based version of the diagnostics, estimation, matchmaking, and/or scheduling modules is hosted by the system provider 106, but available through the affiliate 112, such as via a website widget or plugin.

Figure 4A:
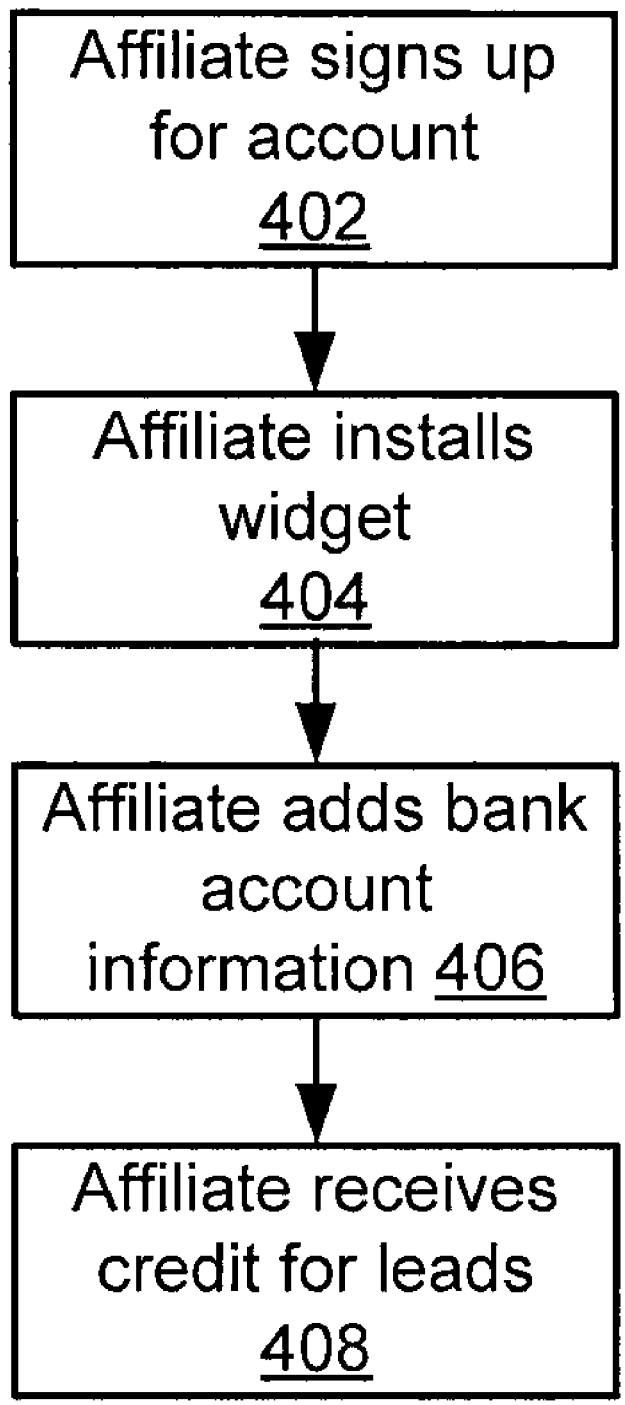
FIG. 4A is a flow chart of an exemplary affiliate initiated method.

Referring to FIG. 4A, in some embodiments, an affiliate signs up for an account at 402, installs a dynamic banner ad (or "widget") into a webpage hosted by a web server associated with the affiliate 112, at 404, enters in financial institution or bank account information, at 406, and receives credits, such as monetary compensation for each user/mechanic lead generated on the affiliate website at 408. In some embodiments, the affiliate can choose the compensation for specific leads, such as by charging more for more expensive vehicles, or for certain types of repairs.

An exemplary web page where the affiliate signs up for the account and installs the widget is shown in FIG. 4B. Exemplary webpages where the affiliate manages the account are shown in FIGS. 4C-4D.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A computer implemented method for providing a user with a vehicle with estimates for repairs of the vehicle, the method comprising:
    receiving a user login for accessing an electronic account for the user;
    receiving vehicle information including location information and vehicle diagnostic information, wherein the vehicle diagnostic information includes information from an on-board computer of the vehicle and vehicle information acquired from the user;
    identifying a problem with the vehicle based on the vehicle information and diagnostic data accessed from at least one diagnostic database, the diagnostic data including repair data, routine maintenance data and non-routine maintenance data;
    determining a repair estimate for repairing the problem based on the identified problem, the vehicle information, and vehicle repair estimate data; and
    transmitting the repair estimate to the user via the electronic account.

2. The method of claim 1, wherein the vehicle information received from the user includes an identification of the vehicle.

3. The method of claim 1, wherein the vehicle information received from the user includes symptoms of the problem with the vehicle.

4. The method of claim 1, wherein the vehicle information received from the user includes a self-identification of the problem with the vehicle.

5. The method of claim 1, further comprising, receiving the vehicle diagnostic information from a third party system provider.

6. The method of claim 1, further comprising receiving the vehicle diagnostic information from a vehicle mechanic.

7. The method of claim 1, further comprising receiving the vehicle repair estimate data from a third party system provider.

8. The method of claim 1, further comprising receiving the vehicle repair estimate data from a vehicle mechanic.

9. The method of claim 1, further comprising:
    generating a list of suitable mechanics based on the identification of the problem, the vehicle information, and mechanic data; and
    transmitting the list to the user.

10. The method of claim 9, wherein the list includes contact information for at least one mechanic.

11. The method of claim 9, wherein the list includes at least one incentive for using a particular mechanic.

12. The method of claim 11, wherein the at least one incentive includes a coupon.

13. The method of claim 9, further comprising scheduling an appointment between the user and at least one mechanic on the list.

14. The method of claim 9, further comprising receiving feedback from the user or the mechanic, where the feedback includes at least an indication whether (i) the estimate was accurate, or (ii) the diagnosis was accurate.

15. The method of claim 14, wherein the step of identifying the problem or the step of determining the repair estimate utilizes the feedback from previous users or mechanics.

16. A computing system for providing a user with a vehicle with estimates for repairs of the vehicle, the method comprising:
    a memory device having executable instructions stored therein; and
    a least one processing device, in response to the executable instructions, operative to:
        receive a user login for accessing an electronic account for the user;
        receive vehicle information including location information and vehicle diagnostic information, wherein the vehicle diagnostic information includes information from an on-board computer of the vehicle and vehicle information acquired from the user;
        identify a problem with the vehicle based on the vehicle information and diagnostic data accessed from at least one diagnostic database, the diagnostic data including repair data, routine maintenance data and non-routine maintenance data;
        determine a repair estimate for repairing the problem based on the identified problem, the vehicle information, and vehicle repair estimate data; and
        transmit the repair estimate to the user via the electronic account.

17. The system of claim 16, wherein the vehicle information received from the user includes at least one of: an identification of the vehicle, symptoms of the problem with the vehicle and a self-identification of the problem with the vehicle.

18. The system of claim 16, wherein the processing device is further operative to receive the vehicle diagnostic information from at least one of: a third party system provider and a vehicle mechanic.

19. The system of claim 16, wherein the processing device is further operative to receive the vehicle repair estimate data from at least one: a third party system provider and a vehicle mechanic.

20. The system of claim 16, wherein the processing device is further operative to:
    generate a list of suitable mechanics based on the identification of the problem, the vehicle information, and mechanic data; and
    transmit the list to the user, wherein the list includes at least one of: contact information for at least one mechanic; at least one incentive for using a particular mechanic.

21. The system of claim 20, the processing device further operative to receive feedback from the user or the mechanic, where the feedback includes at least an indication whether (i) the estimate was accurate, or (ii) the diagnosis was accurate.

* * * * *